United States Patent [19]

Chrysler

[11] Patent Number: 4,796,711
[45] Date of Patent: Jan. 10, 1989

[54] APPARATUS FOR REMOVING PLASTIC FILM FROM RAISED PLANT BEDS

[75] Inventor: Ralph W. Chrysler, Alva, Fla.

[73] Assignee: Row Runner Corp. of America, Alva, Fla.

[21] Appl. No.: 879,469

[22] Filed: Jun. 27, 1986

Related U.S. Application Data

[63] Continuation-in-part of Ser. No. 722,140, Apr. 11, 1985, abandoned.

[51] Int. Cl.⁴ .................................................. A01D 33/08
[52] U.S. Cl. ........................................ 171/1; 171/45; 171/62; 171/74; 171/83; 172/19; 172/33; 172/50; 172/63; 47/9
[58] Field of Search ................... 37/1, 2; 47/9, 29, 56, 47/1; 56/228, 327 R, 327 A, 328; 171/3, 16, 19, 31, 40, 43, 45, 46, 48, 60–65, 83, 86, 101, 109, 110, 143, 138–141, 111, 73, 70, 139, 53, 5, 1, 9, 10, 49, 51, 50, 74, 104, 106; 172/19, 20, 33, 50, 63, 67, 240, 272, 611, 776

[56] References Cited

U.S. PATENT DOCUMENTS

| | | |
|---|---|---|
| 135,458 | 2/1873 | Wright et al. .................. 171/73 |
| 1,206,152 | 11/1916 | Smith .............................. 171/70 |
| 1,854,261 | 4/1932 | Irwin ............................ 171/109 |
| 1,988,254 | 1/1935 | Smith .............................. 171/9 |
| 2,073,939 | 3/1937 | Lair .............................. 171/139 |
| 2,287,367 | 6/1942 | Albin ............................. 171/51 |
| 2,401,653 | 6/1946 | Mohler ............................ 172/20 |
| 2,537,198 | 1/1951 | Wetzel et al. ..................... 171/5 |
| 2,634,663 | 4/1953 | Curtis ........................... 172/611 |
| 2,775,179 | 12/1956 | Chambers et al. ................ 172/272 |
| 3,034,586 | 5/1962 | Ditter ........................... 172/19 |
| 3,043,030 | 7/1962 | Wisbey ........................... 37/102 |
| 3,175,621 | 3/1965 | Kappelmann et al. .............. 171/53 |
| 3,181,455 | 5/1965 | Gouker et al. ................... 47/9 X |
| 3,338,594 | 8/1967 | Schuler ........................ 280/415 A |
| 3,378,279 | 4/1968 | Jacobs ......................... 280/461 A |
| 3,485,512 | 12/1969 | Folkerts ....................... 280/406 R |
| 3,499,492 | 3/1970 | Daymon .......................... 172/19 |
| 3,544,130 | 12/1970 | Hayes ........................... 280/412 |
| 3,610,661 | 10/1971 | Pierce .......................... 172/240 |
| 3,693,721 | 9/1972 | Arnold et al. .................... 171/61 |
| 3,935,904 | 2/1976 | Beck ............................ 172/20 |
| 3,982,711 | 9/1976 | Bradley et al. ................... 172/19 |
| 4,241,792 | 12/1980 | Kratzer .......................... 171/63 |
| 4,245,458 | 1/1981 | Smith ......................... 172/451 X |
| 4,313,502 | 2/1982 | Nelson ........................... 171/63 |
| 4,340,240 | 7/1982 | Anderson ..................... 280/461 A |
| 4,494,611 | 1/1985 | Alvarez ........................ 171/9 X |

FOREIGN PATENT DOCUMENTS

| | | | |
|---|---|---|---|
| 1017367 | 12/1974 | Canada ......................... 172/19 |
| 833567 | 2/1952 | Fed. Rep. of Germany ...... 172/776 |
| 1432692 | 2/1966 | France ......................... 172/776 |
| 2399796 | 4/1979 | France ......................... 171/144 |
| 752190 | 7/1956 | United Kingdom .............. 171/5 |

*Primary Examiner*—James R. Feyrer
*Attorney, Agent, or Firm*—Fleit, Jacobson, Cohn & Price

[57] ABSTRACT

An apparatus used in agriculture and more specifically to an apparatus for removing the plastic film cover from raised plant beds in which the edges thereof are tucked under soil placed in overlying relation to the downwardly inclined side edges of the plastic film thereby enabling separation of the plastic film from the plant bed after the plants have matured and the crop harvested from the plants so that the plastic film can be removed and appropriate cultivation and reshaping of the plant beds may be more effectively accomplished with the apparatus of the present invention materially reducing the time and labor required in removing the plastic film for disposal or recycling.

10 Claims, 5 Drawing Sheets

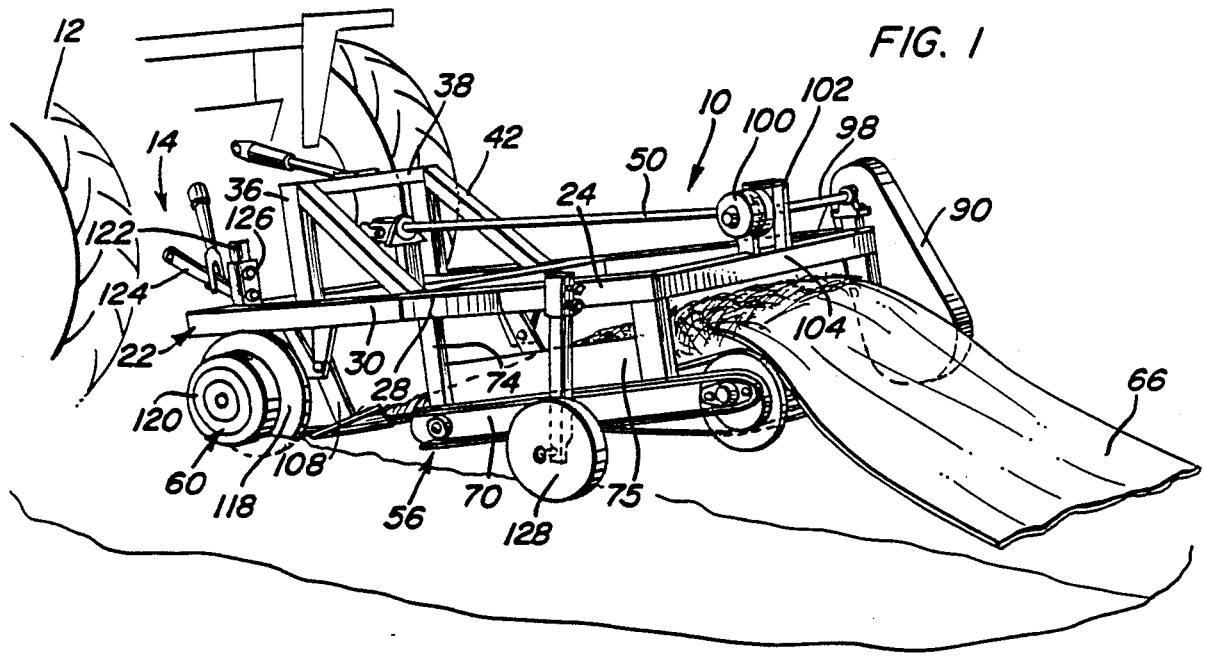

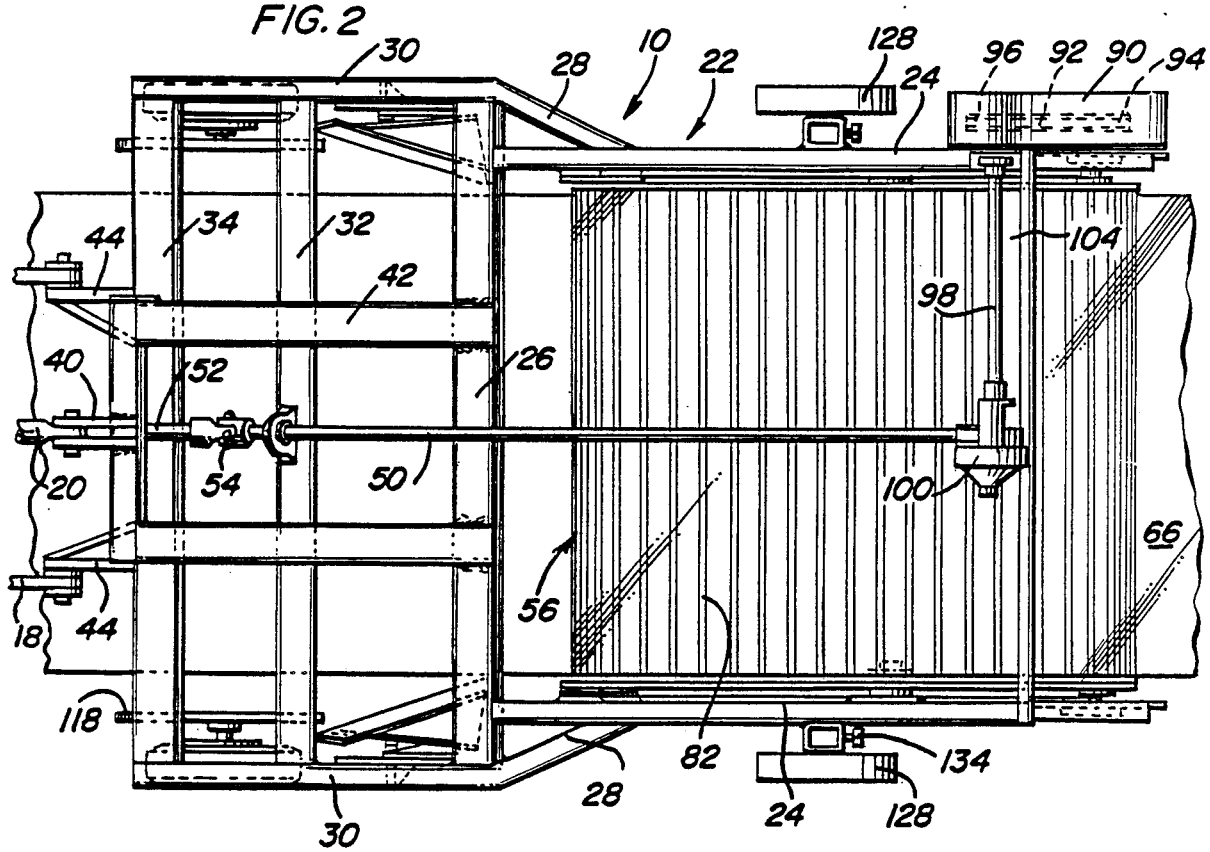
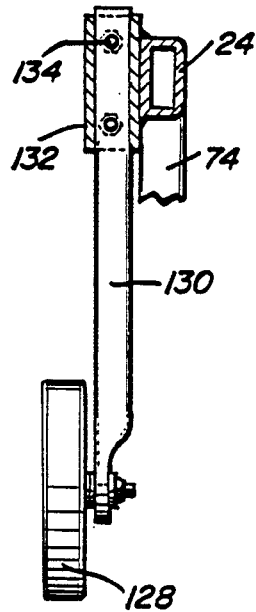
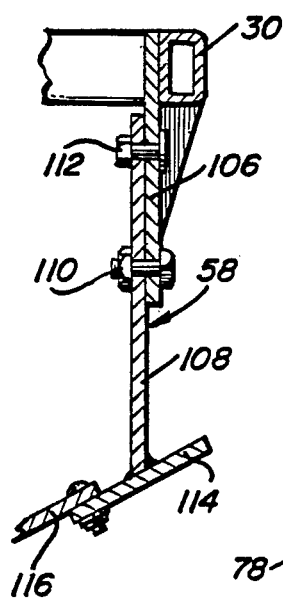
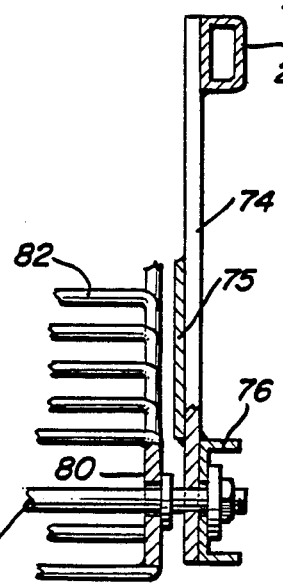

APPARATUS FOR REMOVING PLASTIC FILM FROM RAISED PLANT BEDS

CROSS REFERENCE TO RELATED APPLICATION

This application is a continuation-in-part of my copending application U.S. Ser. No. 722,140, filed Apr. 11, 1985, for TRACTOR ATTACHMENT, now abandoned.

BACKGROUND OF THE INVENTION

1. Field of the Invention

The present invention generally relates to an apparatus used in agriculture and more specifically to an apparatus for removing the plastic film cover from raised plant beds in which the edges thereof are tucked under soil placed in overlying relation to the downwardly inclined side edges of the plastic film thereby enabling separation of the plastic film from the plant bed after the plants have matured and the crop harvested from the plants so that the plastic film can be removed and appropriate cultivation and reshaping of the plant beds may be more effectively accomplished with the apparatus of the present invention materially reducing the time and labor required in removing the plastic film for disposal or recycling.

2. Information Disclosure Statement

The prior art made of record by applicant in the parent application and the prior art cited by the Examiner in the initial action in the parent application are made of record herein. The various prior patents of record disclose that many types of agricultural implements are well known which are connected to a towing vehicle such as a tractor by using various types of hitch assemblies, tool bars and the like. Such known devices include various types of cultivating apparatuses, grading apparatuses and the like which include elements that contact the soil in various arrangements for various purposes. Several of the cited patents relate to sod cutting and removing machines where a strip of sod is cut from the surface of the soil and rolled or otherwise arranged for easy transport and use. However, the only prior patent of record which relates to the removal of a plastic film from the soil surface is U.S. Pat. No. 3,181,455 issued to Z. Gouker et al on May 4, 1965. The structure and function of the structure disclosed in that patent is entirely different from the structure and function of the structure of the invention disclosed in this application.

SUMMARY OF THE INVENTION

In certain agricultural operations, a generally level soil surface is shaped to provide raised plant beds that are covered with a plastic film. The rised plant bed and film which conforms therewith have inclined side edges and the edge portions of the plastic film at the lower portion of the sidewalls of the plant bed are covered with soil to retain the plastic film in place. This is generally referred to as the tuck and prevents the wind from getting under the plastic film and causing it to billow upwardly and be blown off of the plant bed. Once the seeds have germinated into plants or plant seedlings which have been inserted through the plastic film into the bed have developed into mature plants and the crop or produce harvested from the plants, it is then necessary to remove the plastic film in order to reshape the beds, place a new or recycled plastic film thereon and reseed or plant new seedlings for the next crop. The plastic film is usually removed by hand labor which requires considerable time and labor since the side edges of the plastic film are tucked under soil which together with the plants positioned above the film render the plastic film difficult and labor intensive to remove.

Accordingly, it is an object of the present invention to provide an apparatus for removing a plastic film or sheet from a raised plant bed in the form of a frame connected to the three point hitch of a tractor in trailing relation thereto and which includes a conveyor structure driven from the power take-off of the tractor, a pair of disc elements forwardly of the conveyor and side edge lifting blades which extend under the tucked side plastic edges of the plastic film and elevate the edges of the plastic film and the side edge portions of the plant bed so that substantially the entire plant bed is moved onto the upwardly and rearwardly inclined conveyor and conveyed rearwardly between side panels on the conveyor so that the soil covering the upwardly inclined side edges of the plastic film will fall off the side edges of the plastic film as the conveyed portion of the plant bed and plastic film are discharged from the elevated rear of the conveyor. Substantially all of the soil will be removed from the upper surface of the plastic film as it exits from the conveyor at a relatively high speed thereby enabling the film to be easily and quickly removed from the soil surface since the soil forming the tuck over the side edges of the film will not be moved toward the center of the upper surface of the film during transport rearwardly by the conveyor but will fall off of the plastic film as it moves off the conveyor due to maintaining the inclined side edges of the plant bed and the film during movement of the conveyor forwardly and in underlying relation to both the plant bed and the plastic film.

Another object of the invention is to provide an apparatus in accordance with the proceeding object in which the disc elements are vertically adjustable and capable of lateral adjustment for compensating for variation in width of the plastic film and plant bed within the limits defined by the width of the conveyor structure. The lifting blades are oriented between the disc elements and the front lower end of the conveyor and are adjustable laterally to compensate for variation in width of the plastic film and they include a pivotal support structure with a shear bolt to enable rearward pivoting movement of the blades in the event an obstruction is encountered thereby eliminating damage to the blades. Each of the inclined lifting blades includes a removable edge portion in the form of a substantially conventional replaceable plowshare.

A further object of the invention is to provide an apparatus in accordance with the preceding objects in which the disc elements or coulters have a gauge wheel mounted thereon with the periphery of the gauge wheel determining the depth of penetration of the disc element or coulter with the frame including a rear wheel at each side to keep the tractor operator from getting the apparatus too deep in the ground and to support the apparatus when not connected to a tractor with the entire structure being relatively simple in construction, rugged and long lasting and effective for separating plastic film cover from the plant bed and especially removing the soil which overlies the downwardly inclined side edge portions of the plastic film so that the entire top surface of the plastic film will be free of soil when the plastic film is deposited back onto the surface of the field at the rear of the conveyor structure.

These together with other objects and advantages which will beco TM =subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a rear perspective view of the apparatus for removing plastic film from raised plant beds.

FIG. 2 is a top plan view of the apparatus.

FIG. 3 is a side elevational view of the apparatus.

FIG. 6 is a sectional view illustrating the vertically adjustable support wheels the rear of the frame.

FIG. 7 is a sectional view of the supporting structure for the inclined blades at the edges of the conveyor.

FIG. 8 is a vertical sectional view of the conveyor supporting structure.

DESCRIPTION OF THE PREFERRED EMBODIMENT

Figure 4:
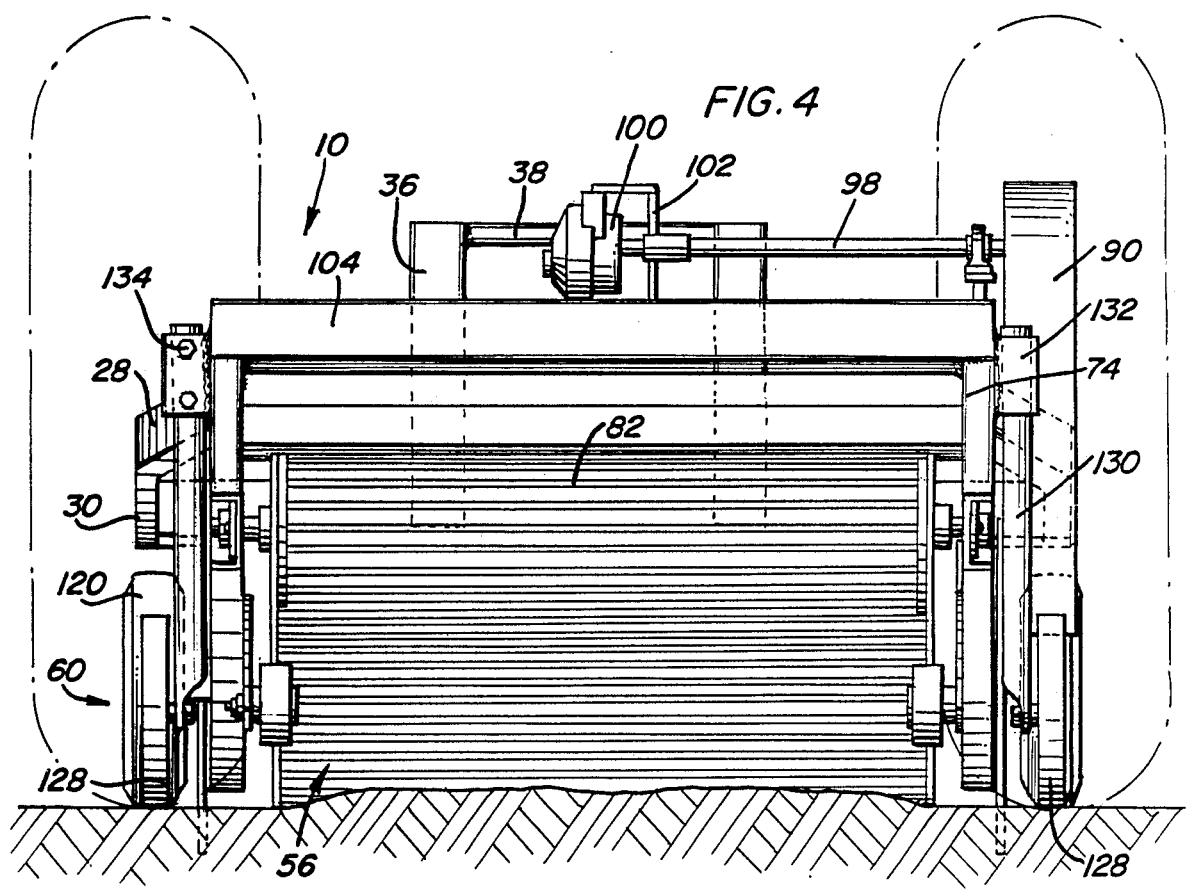
FIG. 4 is a rear elevational view of the apparatus.

Referring now specifically to the drawings, the apparatus for removing plastic film from raised plant beds of the present invention is generally designated by numeral 10 and is in the form of a trailing implement adapted to be connected to a conventional tractor 12 having a three point hitch 14 and a power take-off all of which represent conventional tractor structure with the three point hitch 14 including lower arms 18 and an upper arm or control link 20 for pinned connection to the forward portion of the apparatus 10.

As illustrated, the apparatus of the present invention includes a generally rectangular frame 22 which includes rear longitudinally extending side frame members 24 having the forward ends thereof rigidly connected to cross member 26 inwardly of the ends thereof with a brace 28 interconnecting each end of the cross member 26 and the longitudinal frame member 24. Extending forwardly from the forward end of the braces 28 and the outer ends of the cross member 26 is a pair of front longitudinal side frame members 30 which are rigidly interconnected by cross members 32 and 34 which are parallel to the cross member 26 and perpendicular to the side rails 30 with all of these components being substantially in the same generally horizontally inclined plane as illustrated in FIGS. 1 and 3 with the orientation of these components being illustrated in FIG. 2. The forwardmost cross member 34 is provided with a pair of upstanding beams 36 interconnected by a top member 38 providing a hitch point 40 for the upper arm or control link 20 of the three point hitch. The upper end of each of the upstanding beams 36 is braced by an inclined brace 42 which extends downwardly and rearwardly with the rearward ends being connected to the cross beam 32 or if desired the cross beam 26 thereby providing a rigid A-frame construction for connection with the three point hitch with the cross member 34 also including brackets 44 for pinned connection to the lower arms 18 of the three point hitch as illustrated in FIG. 3. The frame structure provides a rigid upstanding A-frame structure for attachment to the three point hitch in a conventional and well known manner. Also, a supporting pedestal 46 is provided forwardly of or on the cross member 32 to provide a bearing support 48 for a drive shaft 50 extending above the frame 22 and connected to the power take-off through a shorter shaft 52 and a universal connection 54 located forward of the supporting bearing 48. This structure also represents conventional power take-off supporting and connecting structure in order to drive the shaft 50 from the power take-off of the tractor with the three point hitch providing a towing arrangement and a lifting arrangement for the implement or apparatus so that it can be transported when in elevated position and also enabling the tractor to turn around at the end of a field with the apparatus or implement elevated.

Supported from the frame 22 is a longitudinally extending, upwardly and rearwardly inclined conveyor 56, a lifting and laterally inwardly extending blade assembly 58 forwardly of and adjacent the side edges of the conveyor assembly 56 and a depth wheel and disc element assembly 60 located forwardly of the blade assemblies 58 with the blade assemblies 58 and depth wheel and disc element assembly 60 being located at each sdde of the conveyor assembly 56.

Figure 5:
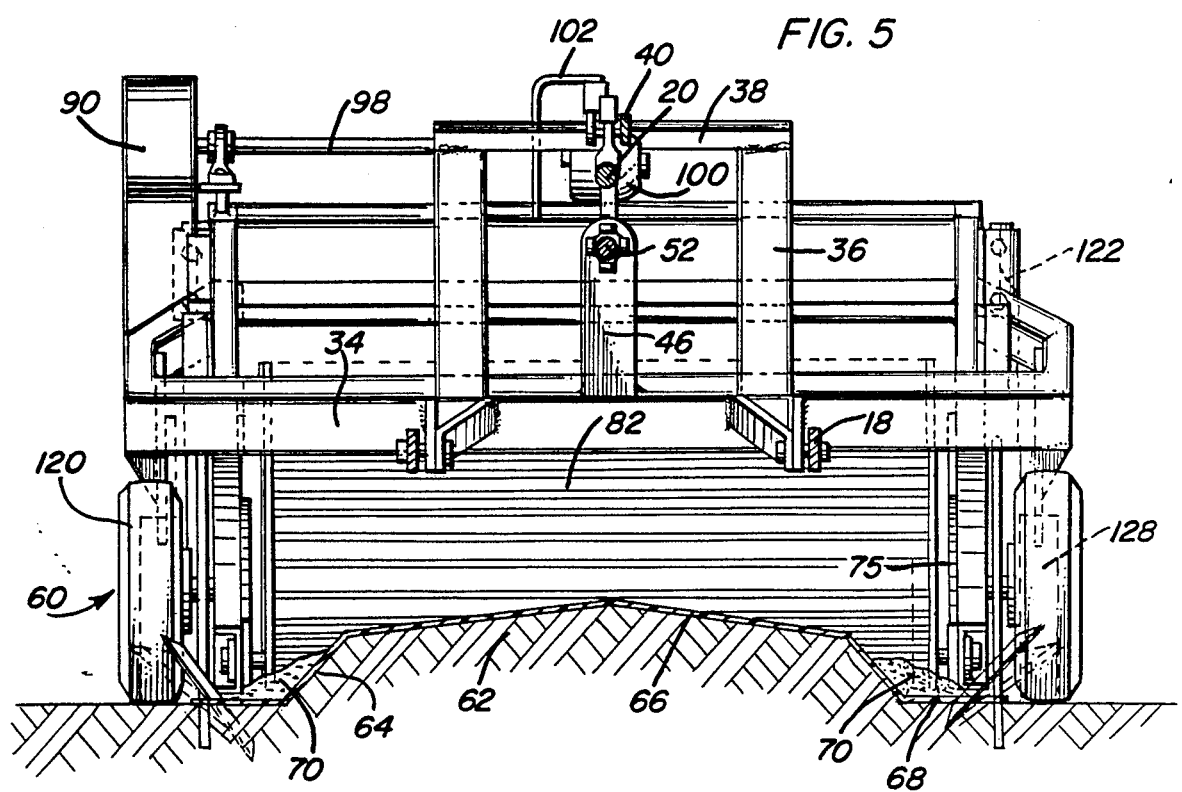
FIG. 5 is a transverse, sectional view taken along section line 5—5 on FIG. 3 at the front of the apparatus.

As illustrated in FIG. 5, a raised plant bed 62 formed in a conventional manner by a bed press in which the soil is formed and compressed to a predetermined width, height and density with the bed sides 64 inclined downwardly and outwardly. The seedbed or plant bed 62 has an upper surface that is generally flat although it may have a certain degree of crown and the plant bed or seedbed including the inclined sidewalls 64 are covered by a plastic film 66 which extends across the top surface of the bed 62 downwardly along the inclined sidewall 64 and laterally outwardly at 68 with the side edges of the plastic film being tucked under the soil by a quantity of covering soil 70 overlying the outwardly extending portion 68 of the plastic film and lying alongside and engaging a portion of the upper surface of the upwardly inclined portion of the plastic film which overlies the inclined wall 64 of the plant bed as illustrated specifically in FIG. 5. This is a conventional planting technique in which seedlings or in some cases seeds are deposited into the raised bed 62 through holes formed in the plastic film 66. In this agricultural technique, it is necessary that the plastic film 66 be removed from the raised plant bed 62 so that the field can be replanted with any necessary cultivation, leveling and reshaping of the plant beds so that the crop producing cycle may be repeated. It is quite labor intensive and time-consuming to manually grasp the plastic film sheet and pull it upwardly due to the edges of the plastic sheet being tucked under the soil 70 and it is the primary function of the present invention to elevate the raised plant bed 62 and plastic film 66 thereon upwardly as the apparatus of the present invention is moved forwardly by the tractor so that the soil 70 which tucks the side edges of the plastic film will fall by gravity off the edges of the film as it exits from the rear of the apparatus so that the raised plant bed and film positioned thereover can be redeposited on the ground surface with the plastic film being substantially devoid of soil on its upper surface.

The conveyor 56 includes depending support beams or brackets 74 rigidly affixed to the frame 22 which support longitudinally extending side beams or rails 76 which are inclined rearwardly and upwardly as illustrated in FIGS. 1 and 3. The forward ends of the side rails 76 support a transverse shaft or rod 78 rotatably supporting sprockets 80 which support the forward end of an endless conveyor member formed by spaced transverse rods or bars 82 which are hooked together and pivoted so that they can proceed in an endless path. The bars 82 may be relatively closely spaced or any type of cleated conveyor belt structure or the like may be utilized for conveying a substantial portion of the plant bed 62 rearwardly. If spaced rods 82 are used, a portion of the plant bed will fall downwardly through the conveyor but due to the forward speed of the tractor and implement, a substantial portion of the plant bed will be maintained on the top surface of the conveyor and the shape of the upper surface of the plant bed which has been lifted by the forward end of the conveyor will be maintained as the conveyor moves forwardly at a rapid pace and the upper flight of the conveyor will move rearwardly at the same speed so that there is no relative linear movement between the elevated plant bed and the conveyor. The rear of the conveyor 56 is supported by sprockets 84 supported on shaft 85 journalled by pillar block bearings 86 adjustably supported on the side rails 76 for tensioning the conveyor. The lower run or return of the conveyor 56 is provided with idling rollers 88 which support the edges of the return flight of the conveyor with there being side rollers or a roller extending completely under the return flight of the conveyor if desired. One end of shaft 85 is disposed in a housing 90 which extends upwardly alongside of the rear beam or bracket 74 with the housing 90 including a drive chain or belt 92 interconnecting a gear 94 on the end of the shaft 85 which supports the sprocket gears 84 and a gear 96 at the upper end of the housing 90 which has a drive shaft 98 connected thereto with the drive shaft 98 extending into the housing 90 and being connected to a gear box 100 supported by a bracket 102 on the rear cross member 104 with the gear box 100 having an input from the drive shaft 50 so that power take-off of the tractor extends through the drive shaft 50, into the gear box 100, through the shaft 98 and through a belt, gear belt or sprocket and chain drive to the shaft 85 supported in the pillar block bearings 86 which supports the sprocket gears 84. Thus, the linear speed of the upper flight of the conveyor 56 can be varied and will correspond with the forward speed of the tractor and the implement so that as the major portion of the plant bed along with the plastic film moves along the upper surface of the conveyor assembly 56, there is very little if any relative movement between the upper flight of the conveyor assembly 56 and the plant bed. The side edge portions of the conveyor 56 are each provided with a vertically extending side plate or panel 75 which is mounted on the inner surface of bracket 74 and extends upwardly from the top edge area of side beam 76 as shown in FIG. 8. The side panels 75 are constructed of sheet metal and parallel side beams 76 and extend upwardly a substantial distance to guide and retain the tuck soil 70 and the conveyor 56 and protects the chain drive housing 90 and the drive components therein from dirt as it moves rearwardly on the conveyor 56. The soil 70 which tucks in the edges of the plastic film will fall off of the plastic film as a substantial portion of the plant bed and the plastic film on top thereof is discharged from the rear of the conveyor 56 so that the upper surface of the plastic film 66 will be substantially completely free of soil. The plastic film then can be easily removed from the upper surface of the plant bed, thereby greatly facilitating the removal of the plastic film for disposal, recycling or for whatever purposes desired.

The lifting blade assembly 58 includes a bracket structure 106 attached to the frame to enable it to be laterally adjusted with a depending support bracket or beam 108 attached to the bracket 106 by a lower bolt 110 and an upper bolt 112 with the upper bolt being in the form of a shear bolt so that in the event the blade assembly engages an obstruction, the shear bolt 112 will be sheared so that the lower end of the blade assembly can swing rearwardly and upwardly and pass over the obstruction without damage to the remainder of the apparatus. The lower end of the beam or bracket 108 is provided with an inclined plate 114 of generally triangular configuration with a pointed forwardly extending end with the blade being inclined inwardly and downwardly and generally forming a moldboard that has a removable plowshare 116 attached thereto by suitable bolt structure so that the plowshare 116 can be replaced when worn in a manner similar to a conventional plowshare on a plow moldboard. The blade assembly 58 extends inwardly and downwardly in underlying relation to the edge of the plastic film with the lateral adjustment of the blade assemblies accommodating different widths of plastic film within the limits of the width of the conveyor 56. Thus, the blades loosen and lift the edge portions of the plastic film 66 and associated soil 70 and also lift a portion of the outer edges of the plant bed to some extent so that the major portion of the plant bed will be elevated onto the top surface of the upper flight of the conveyor 56.

The depth wheel and disc element assembly 60 includes a circular disc element or coulter 118 that will cut debris or plants and the like oriented in front of the blade assembly 58 with the cut formed by the coulter 118 being illustrated in FIG. 3 generally in alignment with the edge of the plastic film and generally in alignment with the blade assembly 58. A depth wheel 120 rotates about the same axis as the coulter 118 and engages the soil surface outwardly thereof to limit the penetration of the periphery of the coulter 118 into the soil. The assembly 60 is supported by a vertical bracket or beam 122 slidably and adjustably supported in a sleeve 124 by bolts 126 with the sleeve 124 being adjustably secured to the frame 22 for lateral adjustment as well as vertical adjustment of the disc element and depth wheel assembly 60.

The depth wheel 120 is preferably in the form of a pneumatic wheel and each of the disc elements or coulters are provided with a penumatic wheel with the peripheral edge of the disc or coulter cutting a groove of predetermined depth through any debris that may be alongside of the plant bed and the groove defines a limit to the cut of the blade assemblies that follow the disc element in which the blade assemblies are inclined both laterally and longitudinally. The blade assemblies are rigidly connected to the frame for vertical adjustment by using matched bolt holes and the mounting bracket or plate for the blades are laterally adjusted by use of U-bolts engaging the frame elements. The upper bolt is a shear bolt and the blade includes a removable plowshare or cutting edge. Both the disc and depth wheel arrangements and the blades are adjustable laterally so that it corresponds to the width of the plastic sheeting which can vary considerably in width depending upon the plant bed and the materials being grown and the center to center spacing of the rows of crop plants.

Each rear corner of frame 22 is provided with a support wheel 128 supported by a vertically extending bracket 130 vertically adjustably supported in sleeve 132 rigidly affixed to side frame member 24 with bolt 134 enabling vertical adjustment. This structure eliminates the problem of the tractor operator setting the apparatus too deep in the ground and cooperates with the front depth wheels 120 to support the machine.

The conveyor disposed rearwardly of the blades is basically a bar- or rod-type conveyor somewhat similar to those used in potato harvesting equipment and the conveyor is rigidly mounted in relation to the frame and actually picks up a major portion of the plant bed and maintains the shape and contour as well as the integrity of the plant bed for the most part during the movement of the plastic film and the plant bed between the side panels 75. This enables any dirt that has been placed over the edge of the plastic along the bottom edge of the sidewalls of the plant bed, called the tuck, to stay on the side edges of the plastic film rather than being directed toward the center of the plastic film. As the plastic film 66, plant bed 62 and tuck soil 70 exit from the rear of the conveyor 56, all of the tuck soil 70 will fall away from the plastic film due to he inclined unsupported side edges of the film 66. This assures that substantially all the dirt is removed from the top surface of the plastic film as the plant bed and plastic film are discharged at a relatively high speed off the rear of the conveyor. The conveyor is driven from the power take-off on the tractor through a bearing assembly adjacent the front of the frame to the gear box by a suitable drive shaft arrangement with the gear box beinglocated at the center of the rearmost cross piece on the frame and drivingly connected at one side through a belt drive, gear belt drive or chain drive to the rear sprocket of the conveyor which enables the rearward movement of the upper flight of the conveyor to correspond with the forward movement of the vehicle so that little linear relative movement occurs between the plant bed and plastic film and the conveyor as the implement moves forwardly at a relatively high speed. The wheels at the front and rear of the frame supports the apparatus when in inoperative or stored position and provides depth control when the apparatus is in use.

In actual practice, this apparatus reduces the labor cost by reducing the time involved in removing plastic film from the plant bed in the field and the main purpose of this apparatus is to loosen and remove the tuck soil from the side edges of the plastic film so that the plastic film then can be quickly and easily picked up and disposed of in any suitable manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. The method of separating a plastic film mulch from a raised plant or seedbed after the plants have matured and the produce crop harvested in which the plastic film has downwardly inclined side edges tucked under soil placed thereon to hold the film in place during the growing and harvesting season, said method consisting of the steps of forming longitudinal slits in the soil surface alongside the side edges of the plastic film and raised plant bed, positioning a blade in a downwardly and laterally inwardly inclined relation under each side edge of the film and partially into the inclined side edges of the raised plant bed, elevating and conveying the plastic film and a substantial portion of the raised plant bed and conveying it rearwardly at a speed equal to the forward speed of the elevating and conveying mechanism while substantially maintaining the shape of the raised plant bed to enable the tuck soil on top of the side edges of the plastic film to be maintained on the side edges of the plastic film and discharging the raised plant bed, plastic film and tuck soil from the rear of the conveying mechanism with the tuck soil falling off the film with the with the plastic film then being substantially free of soil on the upper surface thereof to facilitate removal without hindrance from soil on the upper surface of the plastic film.

2. The method as defined in claim 1 wherein the step of elevating and conveying the plastic film and substantial portion of the plant bed includes the step of elevating the plastic film and plant bed at its highest point at the rear discharge for the film and plant bed with the center crown portion of the plant bed and plastic film shedding loose soil from the upper surface of the plastic film as it is discharged back onto the soil surface.

3. An apparatus for removing plastic film from a raised plant bed comprising frame means adapted to be connected in towing relation to a tractor having a power take-off, a rearwardly and upwardly inclined, longitudinally extending powered and speed controlled conveyor means supported from the frame means and drivingly connected to the power take-off, said conveyor means including an endless conveyor element having an upwardly and rearwardly inclined upper flight and longitudinal side guide panels, the forward end of the conveyor means being positioned transversely of the plant bed and elevating the plant bed and plastic film thereon and moving it rearwardly at a speed equal to the speed of the frame means as the frame means moves along a path of movement, lifting blade means mounted on the frame means forwardly of and generally in alignment with the side guide panels of the conveyor m ⓡans and extending under the edge of the plastic flim and tuck soil overlying the side edges of the plastic film for elevating the tuck soil and side edges of the plastic film and portions of the plant bed for movement onto and along the upper flight of the conveyor means while substantially maintaining their relative shape and orientation, said plastic film and tuck soil being separated and falling off the side edges of the film as the tuck soil, plastic film and portions of the plant bed move along the conveyor means and a disc element located forwardly of each lifting blade means for cutting through debris and other material forwardly of the lifting blade means for cutting through debris and other aterial forwardly of the lifting blade means to facilitate movement of the lifting blade means through the soil surface at the side edges of the plastic film.

4. An apparatus for removing plastic film from a raised plant bed comprising frame means adapted to be connected to a towing vehicle having a power take-off, a rearwardly and upwardly inclined, longitudinally extending powered and speed controlled conveyor means supported from the frame means and drivingly connected to the power take-off, said conveyor means including an endless conveyor element having an upwardly and rearwardly inclined upper flight and longitudinal side guide panels, the forward end of the conveyor means being positioned transversely of the plant bed and elevating the plant bed and plastic film thereon and moving it rearwardly at a speed equal to the speed of the frame means as the frame means moves along a path of movement, lifting blade means mounted on the frame means forwardly of and generally in alignment with the side guide panels of the conveyor means and extending under the edge of the plastic film and tuck soil overlying the side edges of the plastic film for elevating the tuck soil and side edges of the plastic film and portions of the plant bed for movement onto and along the upper flight of the conveyor means while substantially maintaining their relative shape and orientation, said plastic film and tuck soil being separated and falling off the side edges of the film as the tuck soil, plastic film and portions of the plant bed move along the conveyor means and a disc element located forwardly of each lifting blade means for cutting through debris and other material forwardly of the lifting blade means to facilitate movement of the lifting blade means through the soil surface at the side edges of the plastic film, each of said shanks including a mounting bracket at the upper end, bolt means securing the shank to the bracket with the bolt means being spaced with one of the bolts being a shear bolt to enable the shank to pivot rearwardly when the shear bolt is sheared as a result of the blade coming into contact with an obstruction thereby enabling the apparatus to pass the obstruction without damage to the components thereof.

5. An apparatus for removing plastic film from a raised plant bed comprising frame means adapted to be connected to a towing vehicle having a power take-off, a rearwardly and upwardly inclined, longitudinally extending powered and speed controlled conveyor means supported from the frame means and drivingly connected to the power take-off, said conveyor means including an endless conveyor element having an upwardly and rearwardly inclined upper flight and longitudinal side guide panels, the forward end of the conveyor means being positioned transversely of the plant bed and elevating the plant bed and plastic film thereon and moving it rearwardly at a speed equal to the speed of the frame means as the frame means moves along a path of movement, lifting blade means mounted on the frame means forwardly of and generally in alignment with the side guide panels of the conveyor means and extending under the edge of the plastic film and tuck soil overlying the side edges of the plastic film for elevating the tuck soil and side edges of the plastic film and portions of the plant bed for movement onto and along the upper flight of the conveyor means while substantially maintaining their relative shape and orientation, said plastic film and tuck soil being separated and falling off the side edges of the film as the tuck soil, plastic film and portions of the plant bed move along the conveyor means and a disc element located forwardly of each lifting blade meand for cutting through debris and other material forwardly of the lifting blade means to facilitate movement of the lifting blade means through the soil surface at the side edges of the plastic film, said conveyor means including drive means adapted to be connected to the power take-off of the toing vehicle for driving the conveyor means, said conveyor element including a bar-type conveyor including a plurality of transversely extending, closely spaced bars engaging sprocket gears rotatably journalled on shafts, the rearmost shaft being driven with the drive means including a gear box on the frame means having a forwardly extending drive shaft adapted to be connected to the power take-off of the towing vehicle and a lateral drive shaft connected to the rearmost shaft on the conveyor means for driving the conveyor means so that the upper flight thereof moves at a linear speed substantially equal to the forward linear speed of the frame means, said lifting blade means inlcuding a vertically extending support shank supported from the frame means, a generally triangular, inwardly extending and laterally inclined blade at the lower end of the shank at each side of the conveyor means and a removable plowshare on said blade engaged with the soil to enable replacement when worn with the laterally and downwardly inclined blade and plowshare extending into the soil surface alongside of and under the side edges of the plastic film and side edge portions of the plant bed, each of said shanks including a mounting bracket at the upper end, bolt means securing the shank to the bracket with the bolt means being longitudinally spaced with one of the bolts being a shear bolt to enable the shank to pivot rearwardly when the shear bolt is sheared as a result of the blade coming into contact with an obstruction thereby enabling the apparatus to pass the obstruction without damage to the components thereof.

6. The structure as defined in claim 5 wherein said disc element includes a circular coulter having a peripheral edge, a vertical shank vertically and adjustably supporting the coulter from the frame means, and a depth wheel rotatably mounted from the shank and rotatable with the disc element with the depth wheel including a periphery spaced inwardly from the periphery of the coulter to limit the penetration of the periphery of the coulter into the ground surface.

7. The structure as defined in claim 6 wherein said depth wheel is in the form of a pneumatic tire assembly mounted outboard of the coulter for engagement with the soil surface outwardly of the plant bed.

8. The structure as defined in claim 7 together with a vertically adjustable wheel structure mounted on each side of said frame means adjacent the rear thereof and including a shank with a wheel at the bottom thereof, said frame means including a sleeve adjustably supporting the shank for positioning the rear wheels vertically to limit the depth of penetration of the apparatus into the plant bed.

9. The structure as defined in claim 8 wherein said frame means includes a pair of longitudinally extending side rails interconnected by a plurality of cross members forming a rigid frame having the longitudinal and transverse components oriented in a single plane, hitch means at the forward end of the frame for connection with the three point hitch of a tractor.

10. The structure as defined in claim 9 wherein said gear box and forwardly extending drive shaft are located generally centrally of the frame for connection with the power take-off of the tractor.

* * * * *